US010117292B2

(12) United States Patent
Tiwana (10) Patent No.: US 10,117,292 B2
(45) Date of Patent: Oct. 30, 2018

(54) MEDIUM VOLTAGE HEATER ELEMENTS MOISTURE DETECTION CIRCUIT

(71) Applicant: Chromalox, Inc., Pittsburgh, PA (US)

(72) Inventor: Kuldip Tiwana, Hermitage, TN (US)

(73) Assignee: CHROMALOX, INC., Pittsburgh, PA (US)

( * ) Notice: Subject to any disclaimer, the term of this patent is extended or adjusted under 35 U.S.C. 154(b) by 600 days.

(21) Appl. No.: 13/866,434

(22) Filed: Apr. 19, 2013

(65) Prior Publication Data

US 2014/0312028 A1    Oct. 23, 2014

(51) Int. Cl.
*H05B 1/02*    (2006.01)
*H05B 3/44*    (2006.01)
*H02H 3/33*    (2006.01)

(52) U.S. Cl.
CPC ......... *H05B 1/0269* (2013.01); *H05B 1/0283* (2013.01); *H05B 3/44* (2013.01); *H02H 3/33* (2013.01); *H05B 2203/014* (2013.01); *H05B 2203/021* (2013.01)

(58) Field of Classification Search
CPC ... H02H 3/16; H02H 5/00; H05B 1/02; H05B 1/0269; H05B 1/0283; H05B 3/44; H05B 2203/014; H05B 2203/021; F24H 1/142; F24H 1/102
USPC ........ 219/482, 483, 485, 486, 523, 544, 494
See application file for complete search history.

(56) References Cited

U.S. PATENT DOCUMENTS

| 1,394,518 | A | * | 10/1921 | Abbott | H05B 3/48 219/552 |
| 3,668,471 | A | * | 6/1972 | Ambler et al. | 361/45 |
| 3,770,977 | A | * | 11/1973 | McIntosh | 307/41 |
| 3,812,320 | A | * | 5/1974 | Borgren | 219/213 |
| 3,881,163 | A | * | 4/1975 | Lindroth | H05B 3/06 219/541 |
| 3,890,485 | A | * | 6/1975 | Kozbelt | G01K 1/14 219/494 |
| 3,920,963 | A | * | 11/1975 | Beasley | G01K 7/04 219/494 |
| 4,103,319 | A | * | 7/1978 | Crain et al. | 361/106 |
| 4,282,422 | A | | 8/1981 | Payne et al. | |

(Continued)

OTHER PUBLICATIONS

International Search Report and Written Opinion for PCT/US2014/020570, dated May 26, 2014 (11 pages).

*Primary Examiner* — Jimmy Chou
(74) *Attorney, Agent, or Firm* — K&L Gates LLP (57) ABSTRACT

In various embodiments, an electrical heating assembly is disclosed. The electrical heating assembly comprises one or more electrical heating elements. A current leakage sensor is operatively coupled to the one or more heating elements. The current leakage generates a signal indicative of current leakage from the electrical heating elements. The current leakage is proportional to an amount of moisture in contact with the electrical heating elements. A thyristor is coupled to the electrical heating elements. The thyristor is configured to control a power level of the one or more heating elements. A control logic is coupled to the thyristor and the leakage circuit. The control logic is configured to activate the one or more heating elements in a dry-out mode and a control mode. The control logic switches from the dry-out mode to the control mode when the signal indicative of the current leakage is below a predetermined threshold.

19 Claims, 4 Drawing Sheets

(56) References Cited

U.S. PATENT DOCUMENTS

| | | | |
|---|---|---|---|
| 4,617,455 A * | 10/1986 | Schwarzkopf | H05B 3/48 219/523 |
| 4,825,348 A * | 4/1989 | Steigerwald | H02M 3/28 363/132 |
| 4,950,872 A | 8/1990 | Chen | |
| 5,039,842 A * | 8/1991 | Kochajda | H02H 3/16 219/497 |
| 5,066,852 A * | 11/1991 | Willbanks | H05B 3/48 219/541 |
| 5,163,428 A * | 11/1992 | Pless | A61N 1/37 128/908 |
| 5,247,158 A * | 9/1993 | Steinhauser | H05B 3/46 219/534 |
| 5,483,149 A | 1/1996 | Barrett | |
| 5,710,408 A * | 1/1998 | Jones | B64D 15/22 219/213 |
| 5,866,880 A * | 2/1999 | Seitz et al. | 219/483 |
| 5,886,358 A * | 3/1999 | Park | G01N 21/89 250/559.42 |
| 6,191,400 B1 | 2/2001 | Cunningham | |
| 6,218,647 B1 | 4/2001 | Jones | |
| 6,483,079 B2 * | 11/2002 | Sato | F02P 17/12 123/145 A |
| 6,486,442 B2 * | 11/2002 | Wheeler | H05B 3/44 219/243 |
| 6,532,424 B1 * | 3/2003 | Haun et al. | 702/58 |
| 6,555,787 B1 * | 4/2003 | Horn et al. | 219/212 |
| 6,735,496 B1 | 5/2004 | Roman | |
| 6,919,540 B2 * | 7/2005 | Kaastra | H05B 3/26 219/441 |
| 7,035,131 B2 * | 4/2006 | Huang | G11C 7/12 365/149 |
| 7,209,651 B1 * | 4/2007 | Knoeppel | F24H 9/2021 219/482 |
| 7,256,372 B2 | 8/2007 | Knoeppel et al. | |
| 7,372,007 B1 * | 5/2008 | McClanahan | F24H 9/1818 219/236 |
| 7,411,766 B1 * | 8/2008 | Huang | H01H 71/04 335/13 |
| 7,892,423 B2 * | 2/2011 | Rohde et al. | 210/149 |
| 7,919,733 B2 * | 4/2011 | Ellis | F16L 53/008 138/112 |
| 8,022,339 B2 * | 9/2011 | Schlipf | H05B 3/48 219/535 |
| 8,659,857 B2 * | 2/2014 | Gandolfi | 361/42 |
| 8,744,252 B1 * | 6/2014 | Snyder | F24H 1/142 392/465 |
| 8,941,034 B2 * | 1/2015 | Schlipf | B29C 45/2737 219/548 |
| 9,301,341 B2 | 3/2016 | Riley et al. | |
| 2006/0020406 A1 * | 1/2006 | Takakamo | G01R 19/2513 702/64 |
| 2006/0237441 A1 * | 10/2006 | Fujimura | H05B 3/04 219/531 |
| 2006/0291527 A1 * | 12/2006 | Callahan et al. | 373/108 |
| 2007/0125764 A1 | 6/2007 | Knoeppel et al. | |
| 2007/0266586 A1 | 11/2007 | Behbehani | |
| 2009/0014433 A1 * | 1/2009 | O'Neil | G06F 1/206 219/491 |
| 2011/0038645 A1 * | 2/2011 | Oh | H04N 1/00885 399/37 |
| 2011/0049128 A1 * | 3/2011 | Chow | A61F 7/02 219/494 |
| 2011/0163082 A1 | 7/2011 | Mullen | |
| 2013/0221975 A1 * | 8/2013 | Ward | G01R 31/025 324/509 |
| 2014/0263282 A1 | 9/2014 | Riley et al. | |

* cited by examiner

MEDIUM VOLTAGE HEATER ELEMENTS MOISTURE DETECTION CIRCUIT

BACKGROUND

Electrical heating assemblies are used in a variety of applications, including heat exchangers, circulation systems, steam boilers, and immersion heaters. An electric heating assembly generally includes a sheath, dielectric insulation within the sheath, an electrical resistance coil embedded in the dielectric insulation, and a conductor pin extending from the electrical resistance coil. Many applications and systems that include electric heating assemblies are rated for low voltage operations, where voltages below 600 volts can be considered low voltages. For example, many current heat exchangers operate with voltages in the range of 480 to 600 volts. More recently, various applications and systems for electric heating element assemblies have been proposed that operate above 600 volts. For example, heat exchangers that operate in the range of 600 to 38,000 volts have been proposed. These higher capacity heat exchangers are proposed as environmentally friendly alternatives to fuel-based heat exchangers. Voltages between 600 and 38,000 volts can be considered medium voltages. These higher voltages can place greater demands on the electric heating assembly.

A concern with electrical heating assemblies is moisture in contact with the electrical heating elements. Moisture may accumulate within the electrical heating assembly and may cause failure of the electrical heating elements. Current systems utilize a soft-start to attempt to eliminate water in contact with the electrical heating elements. Soft-start systems are ordinarily not intelligent and can only follow a preset start-up process. A soft-start system cannot identify the presence, or absence, of moisture and cannot ensure that moisture has been eliminated from the electrical heating assembly after the soft-start process. The soft-start process may also run for longer than necessary and may result in wasted power, time, and productivity.

SUMMARY

In various embodiments, an electrical heating assembly is disclosed. The electrical heating assembly comprises one or more electrical heating elements. A current leakage sensor is operatively coupled to the one or more heating elements. The current leakage sensor is configured to generate a signal indicative of current leakage from the one or more electrical heating elements. The current leakage is proportional to an amount of moisture in contact with the one or more electrical heating elements. A thyristor is coupled to the one or more electrical heating elements. The thyristor is configured to control a power level of the one or more heating elements. A control logic is coupled to the thyristor and the leakage circuit. The control logic is configured to activate the one or more heating elements in a dry-out mode and a control mode. The control logic switches from the dry-out mode to the control mode when the signal indicative of the current leakage is below a predetermined threshold.

In various embodiments, a method for drying an electrical heater assembly is disclosed. The method comprises activating, by a control logic, one or more heating elements at a first power level. A leakage sensor detects a current leakage of the one or more heating elements. The control logic activates the one or more heating elements at a second power level. The control logic activates the one or more heating elements at the second power level in response to the current leakage detected by the current leakage sensor falling below a predetermined threshold.

In various embodiments, an electrical heating assembly control circuit is disclosed. The electrical heating assembly control circuit comprises a current leakage sensor configured to generate a signal indicative of current leakage from one or more electrical heating elements. The current leakage is proportional to an amount of moisture in contact with the one or more electrical heating elements. The electrical heating control circuit further comprises a thyristor configured to control a power level of the one or more heating elements and a control logic coupled to the thyristor and the leakage circuit. The control logic is configured to control the one or more heating elements. The control logic activates the one or more electrical heating elements in a dry-out mode when the signal indicative of the current leakage is above a predetermined threshold. The control logic transitions to a control mode when the signal indicative of the current leakage is below a predetermined threshold.

BRIEF DESCRIPTION OF THE FIGURES

The features of the various embodiments are set forth with particularity in the appended claims. The various embodiments, however, both as to organization and operation, together with the advantages thereof, may best be understood by reference to the following description, taken in conjunction with the accompanying drawings, wherein:

DESCRIPTION

Reference will now be made in detail to several embodiments, including embodiments showing example implementations of systems and methods for providing a medium voltage heater moisture detection circuit. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1:
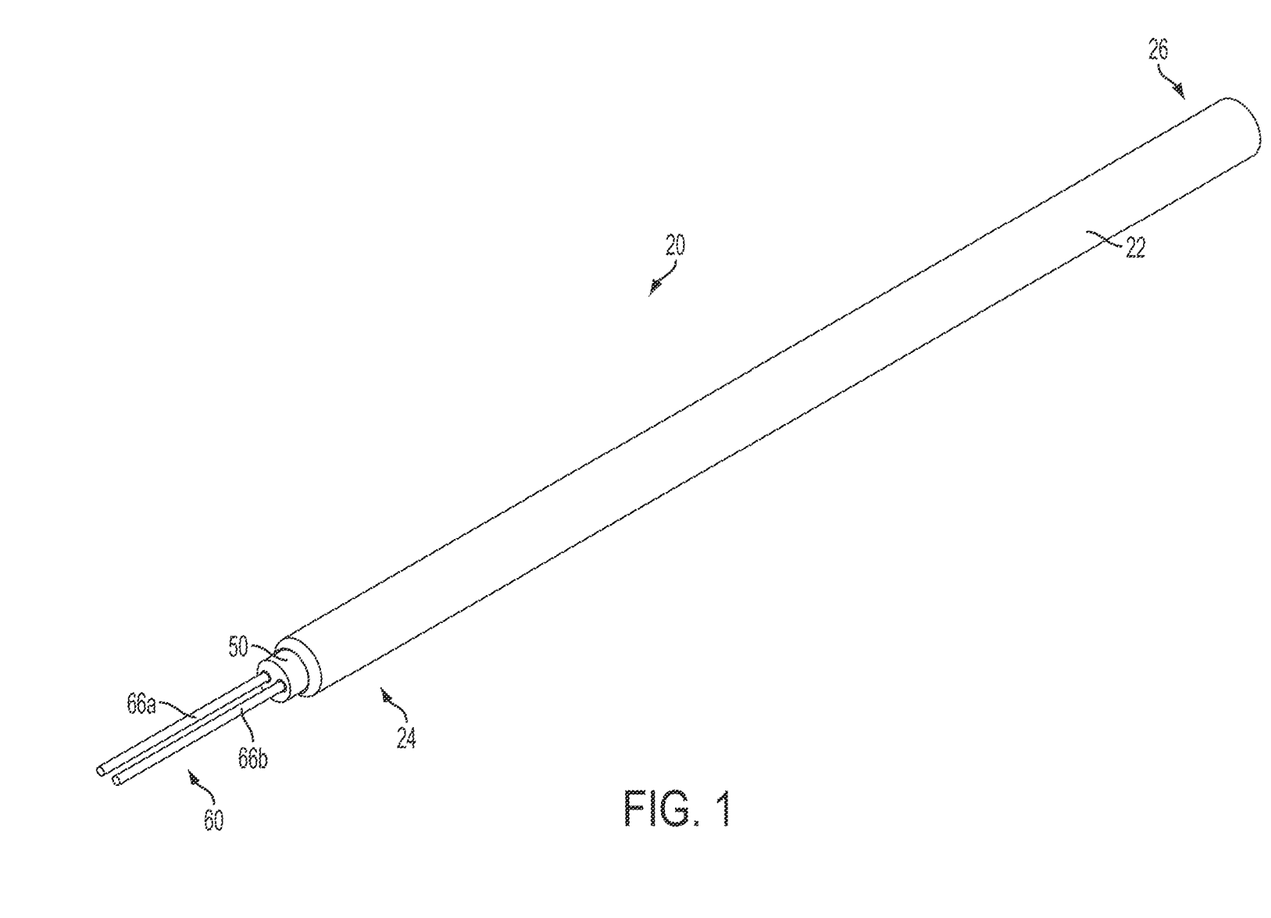
FIG. 1 illustrates one embodiment of an electrical heating assembly.
Figure 2:
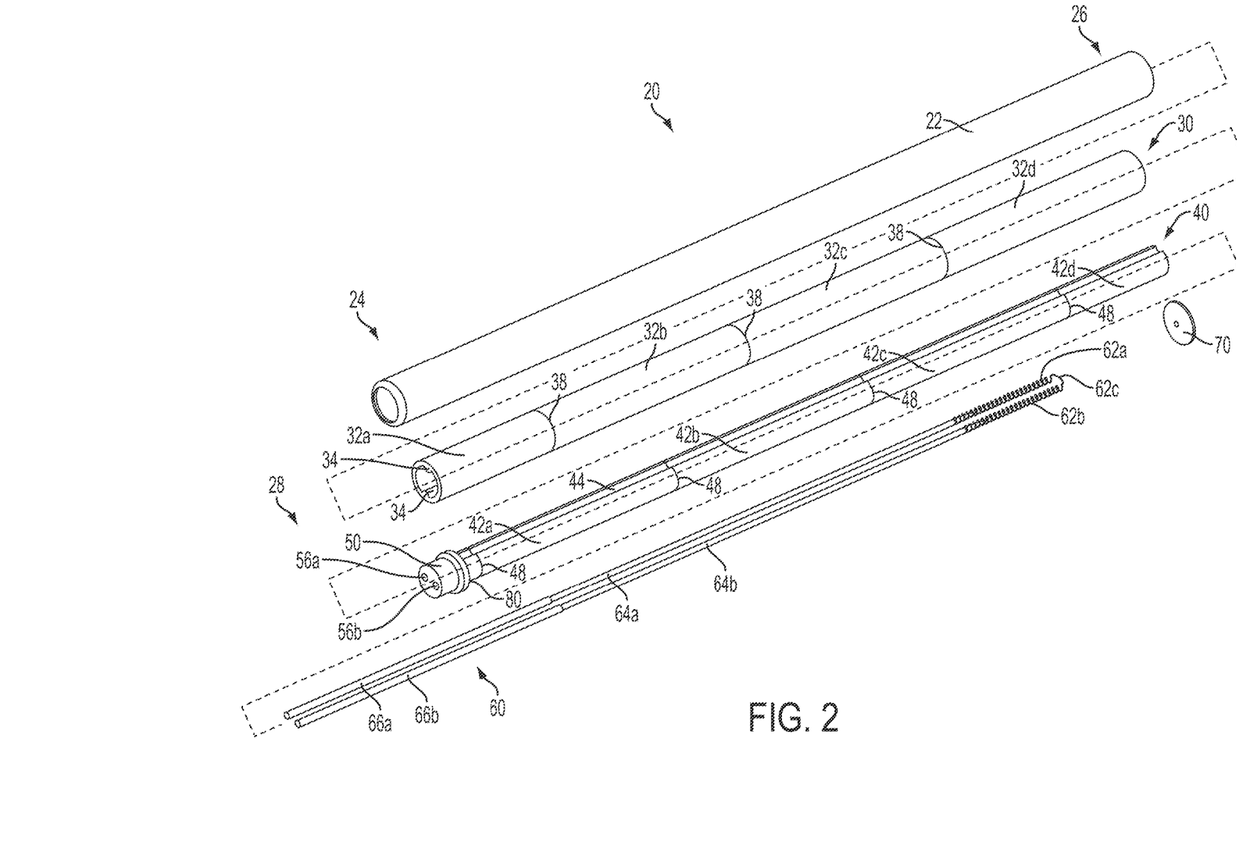
FIG. 2 illustrates an exploded view of the electrical heating assembly of FIG. 1.

FIGS. 1 and 2 illustrate one embodiment of an electrical heating element 20. The electrical heating element 20 may comprise an outer sheath 22 that defines an opening. The outer sheath 22 may house dielectric cores and resistive wire(s) that extend from a first end 24 to a second end 26. In various embodiments, the outer sheath 22 can comprise a tube and/or sleeve, for example, which can at least partially encase and/or enclose the heat generating components of the electric heating element assembly 20. The outer sheath 22 can be a metallic tube, for example, such as a tube comprised of steel, stainless steel, copper, incoloy, inconel and/or hasteloy, for example. In some embodiments, the electrical heating element 20 may comprise a dual core 28. The dual core 28 may include generally cylindrical outer and inner cores 30, 40. The inner core may be nested at least partially within a central opening of the outer core 30, for example. In some embodiments, the outer core 30 may be positioned at least partially within the outer sheath 22, for example. The outer core 30 and/or the inner core 40 may be positioned entirely within the outer sheath 22. The outer core 30 and/or the inner core 40 may comprise an electrically-insulating and/or dielectric material, for example. The electrical heating element 20 may comprise a multi-layer core comprising two or more at least partially nested cores, for example, partially nested dielectric cores.

In some embodiments, the outer core 30 and/or the inner core 40 may comprise multiple core segments. For example, the outer core 30 may comprise a plurality of outer core segments 32a-32d and the inner core 40 may comprise a plurality of inner core segments 42a-42d. In various embodiments, the outer core segments 32a-32d and/or the inner core segments 42a-42d may be axially aligned, and/or positioned end-to-end, for example, so that they collectively extend generally the length of the sheath 22. A boundary 38, 48 may be positioned at the interface of adjacent outer core segments 32a-32d and/or inner core segments 42a-42d. A conductive assembly 60 may be disposed within the inner core 40. The conductive assembly 60 may comprise one or more coiled resistive wires 62a, 62b and/or one or more conductor pins 64a, 64b, for example. The one or more conductor pins 64a, 64b may comprise an insulative sleeve 66a, 66b disposed about the conductor pin 64a, 64b. At least a portion of the resistive wires 62a, 62b may be coiled and may generate heat as current flows through the resistive wires 62a, 62b. The first coiled resistive wire 62a may be coupled to the second coiled resistive wire 62b, for example, by a u-shaped wire 62c. A termination bushing 50 comprising a first passageway 56a and a second passageway 56b and/or a termination disk 70 may be located at either end of the outer sheath 22. The insulative sleeves 66a, 66b may extend through the first passageway 56a and the second passageway 56b. More details about example medium voltage heating elements are provided in U.S. patent application Ser. No. 13/802,842, entitled "MEDIUM VOLTAGE HEATING ELEMENT ASSEMBLY," filed on Mar. 14, 2013, the disclosure of which is herein incorporated by reference in its entirety.

Figure 3:
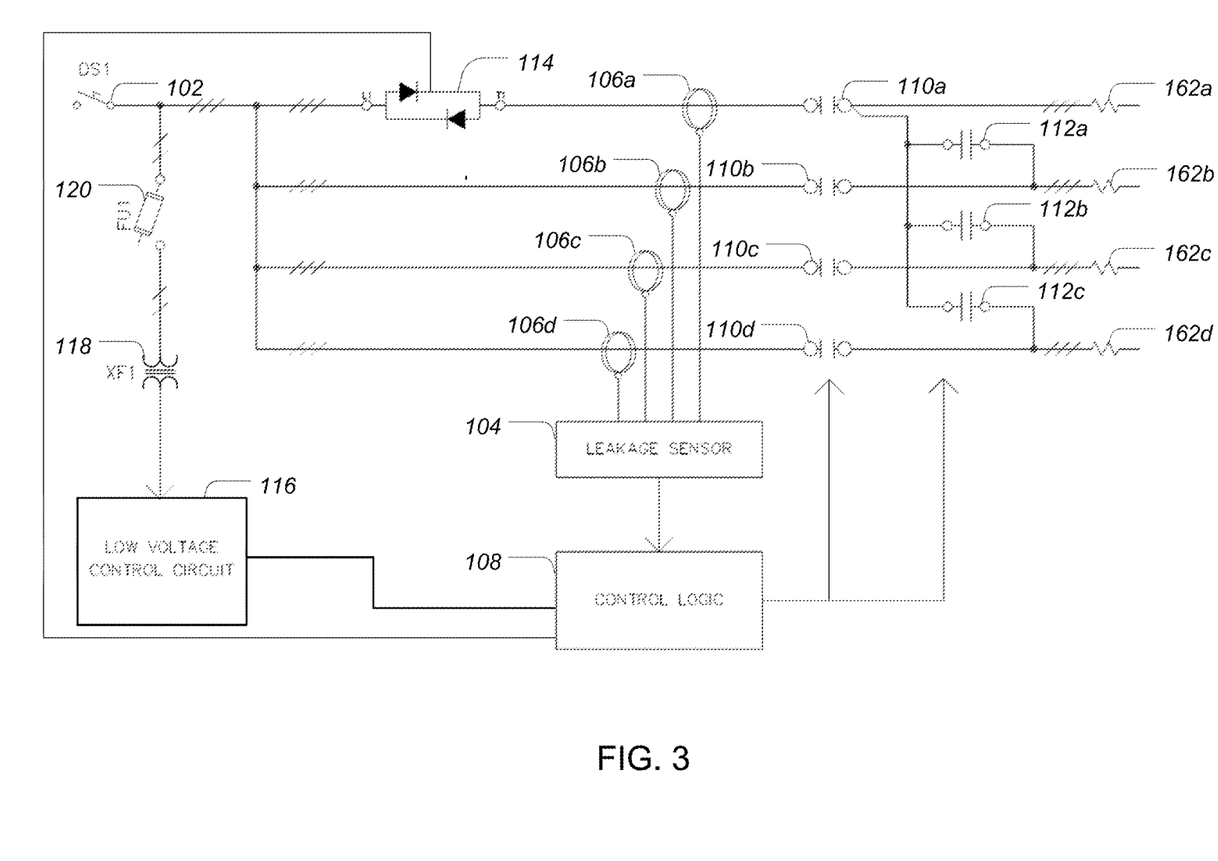
FIG. 3 illustrates one embodiment of an electrical heating assembly comprising a control logic.

In some embodiments, it may be necessary to remove moisture from an electrical heating assembly prior to operation. Moisture within the electrical heating assembly may create alternative current paths for an input current and may result in failure of the electrical heating assembly. Indeed failure of the heater due to moisture may be catastrophic in nature for medium voltage applications between 600 and 38,000 volts. FIG. 3 illustrates one embodiment of an electrical heating assembly 100 comprising a moisture detection circuit. The electrical heating assembly 100 may comprise, for example, electrical heating elements similar to the heating element 20 discussed with respect to FIGS. 1 and 2. The electrical heating assembly 100 may comprise one or more components configured to detect and/or eliminate moisture from within the electrical heating element 100. The electrical heating element 100 may be configured to eliminate moisture from within the electrical heating element prior to full operation of the electrical heating element.

In some embodiments, the electrical heating assembly 100 may comprise a plurality of electrical heating elements 162a-162d. The heating elements 162a-162d may comprise, for example, coiled resistive wires. The heating elements may be coupled to a switch 102. The switch 102 may be configured to connect and/or disconnect the plurality of heating elements 162a-162d to a power source (not shown) e.g., a medium voltage (600-38,000 Volt) power source. The switch 102 may comprise, for example, one or more single-pole switches and/or one or more multiple-pole switches. A leakage sensor 104 may be configured to detect current leakage from the heating elements 162a-162d. The leakage sensor 104 may comprise a plurality of current sensors 106a-106d for detecting the current drawn by the heating elements 162a-162d. For example, in one embodiment, the electrical heating assembly 100 may comprise one or more current sensors 106a-106d associated with each heating element 162a-162d. The current sensors 106a-106d may be configured to detect the current leakage from each of the heating elements 162a-162d caused by moisture in contact with the heating elements 162a-162d. In some embodiments, the amount of current leakage detected by the leakage sensor 104 may be proportional to the amount of moisture in contact with the each of the plurality of heating elements 162a-162d.

In some embodiments, the current sensors 106a-106d may comprise one or more loops. The one or more loops may be disposed about one or more wires connecting the heating elements 162a-162d to the switch 102. Those skilled in the art will recognize that the heating elements 162a-162d and the switch 102 may be coupled by one or more wires. The loops of the current sensors 106a-106d may be configured to detect, for example, a vector sum of the currents flowing through one or more wires respectively coupling the plurality of heating elements 162a-162d to the switch 102. For example, as shown in FIG. 3, each of the heating elements 162a-162d may be coupled to the switch 102 by three wires (e.g., for three-phase power). The current sensors 106a-106d may be configured to detect the vector sum of currents within each of the sets of three wires connecting the heating elements 162a-162d to the switch 102. If no current leakage occurs at a heating element, such as, for example a first heating element 162a, the vector sum of currents through the associated current sensor 106a will be zero. If current leakage does occur at the first heating element 162a, the vector sum of currents through the associated current sensor 106a will be a non-zero value. The current sensors 106a-106d may provide a signal to the leakage sensor 104 indicative of the vector sum of the currents through the current sensor 106a-106d. In some embodiments, the leakage sensor 104 and the plurality of current sensors 106a-106d may comprise, for example, a ground fault interrupt sensor, an earth leakage sensor, and/or any other suitable current leakage sensor. In some embodiments, the current leakage from the heating elements 162a-162d may be proportional (or assumed to be proportional) to the amount of moisture in contact with the heating elements 162a-162d.

The leakage sensor 104 may detect the current leakage from the plurality of heating elements 162a-162d, such as, for example, through the plurality of current sensors 106a-106d. The leakage sensor 104 may provide one or more signals indicative of the current leakage measurements to a control logic circuit 108. The control logic circuit 108 may be configured to control operation of the heating assembly 100, such as, for example, by activating or deactivating the heating elements 162a-162d. For example, in some embodiments, the control logic circuit 108 may be coupled to one or more contactors (e.g., vacuum contactors) configured to control operation of the heating elements 162a-162d. For example, in some embodiments, a plurality of primary contactors 110a-110d and a plurality of secondary contactors 112a-112c may be configured to control operation of the heating elements 162a-162d. The control logic circuit 108 may be configured to control one or more of the primary contactors 110a-110d and/or one or more of the secondary contactors 112a-112c to activate one or more of the heating elements 162a-162d, as described further below.

In some embodiments, the control logic circuit 108 may comprise a programmable logic device, such as, for example, a programmable logic array (PLA), a field programmable gate-array (FPGA), a complex programmable logic device (CPLD), and/or any other type of programmable logic circuit and/or combination thereof. In some embodiments, the control logic circuit 108 may comprise a memory unit, such as, for example, a random access memory (RAM) unit, a flash memory unit, and/or any other type of volatile or nonvolatile memory, and/or any combination thereof. The memory unit may be configured to store data associated with the heating assembly 100 as described in more detail below. In some embodiments, a low-voltage control circuit 116 may be configured to provide power to the control logic circuit 108 and/or the leakage sensor 104. The low voltage control circuit 116 may be coupled to the medium-voltage power source through a step-down transformer 118. The step-down transformer 118 may be configured to decrease the input voltage from the medium voltage range to a range suitable for powering the control logic circuit 108 and/or the leakage sensor 104. A fuse 120 may be coupled to the step-down transformer 118 and the low voltage control circuit 116 to provide surge protection for the control logic circuit 108 and/or the leakage sensor 104.

In some embodiments, the control logic circuit 108 may be coupled to a thyristor 114 or other type of solid-state semiconductor bistable gated switch. The thyristor 114 may be configured to regulate a voltage, or power level, delivered to one or more of the heating elements 162a-162d by the power source. The thyristor 114 may comprise, for example, a silicon controlled rectifier. The thyristor 114 may be configured to control a power level delivered to one or more of the plurality of heating elements, for example, from 0-100% of a maximum power level based on a received control signal from the control logic circuit 108. For example, the control logic circuit 108 may be configured to generate a control signal for the thyristor 114 to regulate the power level of the heating elements 162a-162d based on the leakage current sensed by the leakage sensor 104. For example, in some embodiments, the control logic circuit 108 may provide a control signal comprising a current of 4 mA to 20 mA to the thyristor 114, wherein 4 mA corresponds to a power level of zero and 20 mA corresponds to a power level of 100%. The power level provided by the thyristor 114 may increase linearly as the current increases from 4 mA to 20 mA. Although a range of 4 mA to 20 mA has been discussed, those skilled in the art will recognize that a thyristor 114 may be configured for any range of currents and may comprise a linear or non-linear response. In some embodiments, the thyristor 114 may be rated for the same or a higher voltage than the voltage provided by the power supply to the heating elements 162a-162d.

In some embodiments, the control logic circuit 108 may configure the electrical heating assembly 100 to operate in a dry-out mode or in a control mode. In the dry-out mode, the control logic circuit 108 may simultaneously activate the plurality of heating elements 162a-162d at a first power level through the thyristor 114. For example the control signal from the control logic circuit 108 may control the thyristor 114 to provide a specific voltage amount, or power level, to the heating elements 162a-162d. For example, the control signal may set the thyristor 114 to the first power level, which may be, for example, percentage of the maximum power deliverable to the heating elements 162a-162d, such as, for example, 5-10% of the maximum power. The control logic circuit 108 may simultaneously activate the heating elements 162a-162d at the first power level by, for example, closing, or activating, the first primary contactor 110a and the plurality of secondary contactors 112a-112c. With the first primary contactor 110a and the plurality of secondary contactors 112a-112c closed, current may flow through the thyristor 114, the first primary contactor 110a, each of the plurality of secondary contactors 112a-112c, and each of the heating elements 162a-162d, at the first power level. Because the current path for the power source flows through the thyristor 114 for each of the heating elements 162a-162d, the heating elements 162a-162d are simultaneously set to the first power level.

In some embodiments, the control logic circuit 108 may maintain the heating elements 162a-162d in the dry-out mode until the leakage sensor 104 indicates that the current leakage for each of the heating elements 162a-162d is below a predetermined level. A current leakage below the predetermined threshold may indicate, for example, that substantially no moisture (or a sufficiently low amount) is in contact with the heating elements 162a-162d. When the current leakage sensor 104 indicates that the current leakage for each of the heating elements 162a-162d is below the predetermined threshold, the control logic circuit 108 may transition the heating assembly 100 from the dry-out mode to a normal operation, or control, mode. The control logic circuit 108 may transition the heating assembly 100 from the dry-out mode to the normal operation mode by, for example, activating the heating elements 162a-162d at a second power level. For example, the control logic circuit 108 may close the plurality of primary contactors 110a-110d, opening and/or close the plurality of secondary contactors 112a-112c, and/or set the thyristor 114 to a second power level (e.g., the desired power level for the heating assembly's 100 application).

For example, in some embodiments, in the control mode, the second power level may comprise 100% of the maximum power or may be less than 100% of the maximum output of the heating assembly 100, depending on the heater assembly's 100 application. The control logic circuit 108 may operate the heating assembly 100 at a second power level less than 100% by, for example, individually activating or deactivating one or more of the heating elements 162a-162d. The control logic circuit 108 may activate and/or deactivate one or more of the heating elements 162a-162d by, for example, opening one or more of the plurality of primary contactors 110a-110d and/or one or more of the plurality of secondary contactors 112a-112c. As another example, the control logic circuit 108 may operate the heating assembly 100 at a power level of less than 100% by closing the first primary contactor 110a and the plurality of secondary contactors 112a-112c and controlling the power level provided by the thyristor 114 to the heating elements 162a-162d. The control logic circuit 108 may adjust the control signal to the thyristor 114 to alter the power level delivered to the heating elements 162a-162d.

In some embodiments, the control logic circuit 108 may store historic current leakage data for the heating assembly 100. For example, the control logic circuit 108 may monitor the current leakage detected by the leakage sensor 104 over a predetermined time period, such as, for example, the operational period of the heating assembly 100. The control logic circuit 108 may periodically store the current leakage detected by the leakage sensor 104. The control logic circuit 108 may store the current leakage data, for example, in a computer-readable storage medium. The computer-readable storage medium may be integral with the control logic circuit 108, may be removable from the control logic circuit 108, or may be located remotely from the control logic circuit 108. The control logic circuit 108 may store additional data with respect to the heating assembly 100 that may be associated with the stored current leakage data. For example, the control logic circuit 108 may store data indicative of which of the heating elements 162a-162d were active and/or producing current leakage, the power level of the active heating elements 162a-162d, and/or the mode of the electrical heating assembly 100 when the current leakage was recorded, such as, for example, a dry-out mode or a control mode.

In some embodiments, the control logic circuit 108 may configure the heating assembly 100 in the dry-out mode as a start-up mode and may transition to the control mode when the leakage sensor 104 indicates a current leakage for the heating elements 162a-162d below a predetermined threshold. For example, when the switch 102 is closed, the control logic circuit 108 may configure the heating assembly 100 in the dry-out mode. The control logic circuit 108 may activate the heating elements 162a-162d at a first power level, for example, by providing a control signal to the thyristor 114 to set the thyristor 114 to a predetermined power level, such as, for example, 5-10% of the maximum power, and closing the first primary contactor 110a and the second plurality of contactors 112a-112c. The control logic circuit 108 may monitor the current leakage detected by the leakage sensor 104. The control logic circuit 108 may maintain the plurality of heating elements 162a-162d in the dry-out mode until the leakage sensor 104 indicates current leakage below a predetermined threshold. When the current leakage detected by the leakage sensor 104 is below the predetermined threshold, the control logic circuit 108 may transition the heating assembly 100 from the dry-out mode to the control mode. The control logic circuit 108 may activate one or more of the heating elements 162a-162d by closing one or more of the primary contactors 110a-110d. The control logic circuit 108 may continue to monitor the current leakage detected by the leakage sensor 104 and may transition back to thedry-out mode if the current leakage detected by the leakage sensor 104 exceeds the predetermined threshold.

Figure 4:
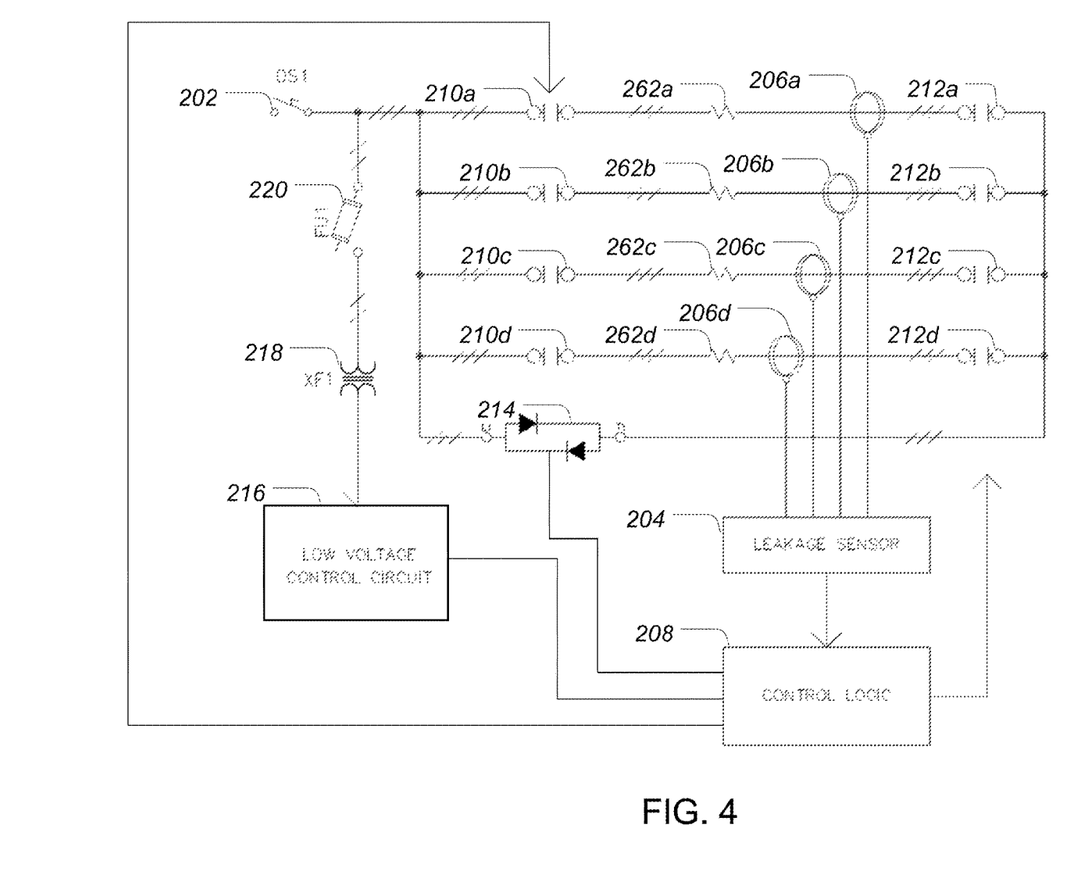
FIG. 4 illustrates one embodiment of an electrical heating assembly comprising a control logic.

FIG. 4 illustrates one embodiment of a heating element 200. The heating element 200 is similar to the heating assembly 100. The heating element 200 may comprise a plurality of heating elements 262a-262d coupled to a switch 202. The heating elements 262a-262d may comprise, for example, coiled resistive wires, such as, for example, the coiled restive wires illustrated in FIGS. 1 and 2. A leakage sensor 204 and a plurality of current sensors 206a-206d may be configured to detect current leakage caused by moisture in contact with the heating elements 262a-262d. A control logic circuit 208 may be coupled to the leakage sensor 204 and may be configured to control the heating elements 262a-262d and/or a thyristor 214.

In some embodiments, the control logic circuit 208 may be configured to control the plurality of heating elements 262a-262d, for example, by controlling a plurality of primary contactors 210a-210d and a plurality of secondary contactors 212a-212d. The control logic circuit 208 may activate one or more of the primary contactors 210a-210d and/or secondary contactors 212a-212d to activate one or more of the heating elements 262a-262d. The control logic circuit 208 may be coupled to a thyristor 214 configured to control a power level delivered to one or more of the heating elements 262a-262d. The thyristor 214 may be similar to the thyristor 114 discussed with respect to FIG. 3 and may be controlled by a variable control signal from the control logic circuit 208. The thyristor 214 may be configured, for example, to control the power level of the heating elements 262a-262d in a linear fashion from 0-100% of the maximum power delivered by a power source.

In some embodiments, the control logic circuit 208 may configure the heating element 200 in a start-up, or dry-out mode. The dry-out mode may comprise, for example, sequentially activating each of the plurality of heating elements 262a-262d at a predetermined power level. The control logic circuit 208 may maintain each of the sequentially activated heating elements 262a-262d at the predetermined power level until the leakage sensor 204 indicates a current leakage for the activate heating element below a predetermined threshold. The current leakage detected by the leakage sensor 204 may be proportional to an amount of moisture in contact with the heating elements 262a-262d. A current leakage below the predetermined threshold may indicate that the moisture level in contact with the active heating element is within an acceptable range. For example, the predetermined threshold may indicate that substantially no moisture is in contact with the activated heating element. The control logic circuit 208 may sequentially activate the heating elements 262a-262d by, for example, generating a series of control signals for the plurality of primary contactors 210a-210d and the plurality of secondary contactors 212a-212d. In some embodiments, the predetermined power level may comprise any suitable power level for drying the active heating element, such as, for example, 100% of the maximum power provided by the power source.

For example, in one embodiment, the control logic circuit 208 may send a control signal to the thyristor 214 to set the power level delivered to the heating elements 262a-262d to a predetermined power level, such as, for example, 100% of the maximum power provided by the power source. The control logic circuit 208 may activate a first primary contactor 210a and a first secondary contactor 212a to activate a first heating element 262a. The control logic circuit 208 may monitor the current leakage from the first heating element 262a as detected by the leakage sensor 204 and a first current sensor 206a. The control logic circuit 208 may maintain the first heating element 262a in an active state at the predetermined power level until the leakage sensor 204 detects a current leakage from the first heating element 262a below a predetermined threshold. A current leakage below the predetermined threshold may indicate that substantially no moisture is in contact with the first heating element 262a.

When the leakage sensor 204 detects a current leakage of the first heating element 262a below the predetermined threshold, the control logic circuit 208 may deactivate the first heating element 262a, for example, by opening the first primary contactor 210a and the first secondary contactor 212a. The control logic circuit 208 may sequentially activate a second heating element 262b by, for example, closing a second primary contactor 210b and a second secondary contactor 212b. The control logic circuit 208 may maintain the second heating element 262b in an active state at the predetermined power level until the leakage sensor 204 indicates a current leakage from the second heating element 262b below the predetermined threshold. When the leakage sensor 204 indicates a current leakage from the second heating element 262b below the predetermined threshold, the control logic circuit 208 may deactivate the second heating element 262b by, for example, opening the second primary contactor 210b and the second secondary contactor 212b.

The control logic circuit 208 may sequentially activate a third heating element 262c. The control logic circuit 208 may activate the third heating element 262c by, for example, closing the third primary contactor 210c and the third secondary contactor 212c. The control logic circuit 208 may maintain the third heating element 262c in an active state at the predetermined power level until the leakage sensor 204 indicates a current leakage from the third heating element 262c below a predetermined threshold. Once the leakage sensor 204 indicates that the current leakage from the third heating element 262c is below the predetermined threshold, the control logic circuit 208 may deactivate the third heating element 262c by, for example, opening the third primary contactor 210c and the third secondary contactor 212c.

The control logic circuit 208 may sequentially activate a fourth heating element 262d. The control logic circuit 208 may activate the fourth heating element 262d by, for example, closing the fourth primary contactor 210d and the fourth secondary contactor 212d. The control logic circuit 208 may maintain the fourth heating element 262d in an active state at the predetermined power level until the leakage sensor 204 indicates the current leakage from the fourth heating element 262d is below a predetermined threshold. Once the leakage sensor 204 indicates that the current leakage from the fourth heating element 262d is below the predetermined threshold, the control logic circuit 208 may deactivate the fourth heating element, by, for example, opening the fourth primary contactor 210d and the fourth secondary contactor 212d.

In some embodiments, the control logic circuit 208 may transition the heating element 200 from a dry-out mode to a control mode. The control logic circuit 208 may transition to the heating element 200 to the control mode when the leakage sensor 204 indicates that the current leakage from each of the heating elements 262a-262d is below the predetermined threshold. In the control mode, the control logic circuit 208 may control operation of one or more of the heating elements 262a-262d based on, for example, a pre-programmed heating routine and/or a real-time heating routine based on one or more inputs. For example, in one embodiment, the heating element 200 may be set to 50% output. The control logic circuit 208 may activate the first and second heating elements 262a, 262b to provide 50% output from the heating element 200. The control logic circuit 208 may active the first and second heating elements 262a, 262b by, for example, closing the first and second primary contactors 210a, 210b and the first and second secondary contactors 212a, 212b. In some embodiments, the control logic circuit 208 may control the output of the heating element 200 by controlling the power level of the heating elements 262a-262d through the thyristor 214. For example, in one embodiment, the heating element 200 may be set to 50% output by the control logic circuit 208. The control logic circuit 208 may activate all of the heating elements 262a-262d by, for example, closing the plurality of primary contactors 210a-210d and the plurality of contactors 212a-212d. The control logic circuit 208 may set the thyristor 214 to a 50% power level by providing, for example, a control signal to the thyristor 214.

In some embodiments, the control logic circuit 208 may be configured to store historical current leakage for the heating element 200. For example, the control logic circuit 208 may monitor the current leakage detected by the leakage sensor 204 over a predetermined time period, such as, for example, the operational period of the heating element 200. The control logic circuit 208 may periodically store the current leakage detected by the leakage sensor 204. The control logic circuit 208 may store the current leakage data, for example, in a computer-readable storage medium. The computer-readable storage medium may be integral with the control logic circuit 208, may be removable from the control logic circuit 208, and/or may be located remotely from the control logic circuit 208. The control logic circuit 208 may further store the operational state of the heating assembly associated with the stored current leakage data.

The functions of the various functional elements, logical blocks, modules, and circuits elements described in connection with the embodiments disclosed herein may be implemented in the general context of computer executable instructions, such as software, control modules, logic, and/or logic modules executed by the processing unit. Generally, software, control modules, logic, and/or logic modules comprise any software element arranged to perform particular operations. Software, control modules, logic, and/or logic modules can comprise routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits ASICs, FPGAs, DSPs, or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. An electrical heating assembly comprising:
   one or more medium voltage electrical heating elements that are configured to receive power from a medium voltage power source that supplies between 600 and 38,000 volts to the one or more medium voltage electrical heating elements, wherein the one or more medium voltage electrical heating elements each comprises:
      an outer metal sheath;
      a resistive wire; and
      a dual dielectric core positioned within the outer metal sheath, wherein the dual dielectric core comprises:
         a first series of two or more axially-aligned outer tubular dielectric bodies positioned end-to-end, wherein the first series of two or more axially-aligned outer tubular dielectric bodies define a central longitudinal opening and have a first longitudinal axis; and
         a second series of two or more axially-aligned inner tubular dielectric bodies having a second longitudinal axis, wherein:
            the second series of two or more axially-aligned inner tubular dielectric bodies are positioned end-to-end in the outer metal sheath and are nested at least partially within the central longitudinal opening inside the first series of two or more axially-aligned outer tubular dielectric bodies;
            the first longitudinal axis is co-axial with the second longitudinal axis;
            the second series of two or more axially-aligned inner tubular dielectric bodies define an interior passageway and the resistive wire is positioned in the interior passageway; and
            the second series of two or more axially-aligned inner tubular dielectric bodies are longitudinally staggered relative to the first series of two or more axially-aligned outer tubular dielectric bodies;
   a current leakage sensor configured to generate a signal indicative of current leakage from the one or more medium voltage electrical heating elements, wherein the current leakage is proportional to an amount of moisture in contact with the one or more medium voltage electrical heating elements, and wherein the signal is a vector sum of a current flowing through the one or more medium voltage electrical heating elements;
   a thyristor coupled to the one or more medium voltage electrical heating elements, wherein the thyristor is configured to control a power level of the one or more medium voltage electrical heating elements; and a control logic circuit coupled to the thyristor and the current leakage sensor, wherein the control logic circuit is configured to control the one or more medium voltage electrical heating elements and the thyristor based on the signal indicative of the current leakage from the one or more medium voltage electrical heating elements sensed by the current leakage sensor, and wherein the control logic circuit is configured to maintain the one or more medium voltage electrical heating elements at a first power level, in a dry-out mode, while the current leakage detected by the current leakage sensor is proportional to an unacceptable range of moisture in contact with the one or more medium voltage electrical heating elements.

2. The electrical heating assembly of claim 1, wherein the control logic circuit operates the one or more medium voltage electrical heating elements in a control mode when the signal indicative of the current leakage is below a predetermined threshold.

3. The electrical heating assembly of claim 2, wherein the dry-out mode comprises the control logic circuit simultaneously operating the one or more medium voltage electrical heating elements at the first power level.

4. The electrical heating assembly of claim 3, wherein the first power level comprises 5-10% of a maximum power level of the electrical heating assembly.

5. The electrical heating assembly of claim 2, wherein, in the dry-out mode, the control logic circuit sequentially operates the one or more medium voltage electrical heating elements at the first power level.

6. The electrical heating assembly of claim 5, wherein the first power level comprises 100% of a maximum power level of the electrical heating assembly.

7. The electrical heating assembly of claim 2, wherein the thyristor comprises a silicon controlled rectifier.

8. The electrical heating assembly of claim 2, wherein:
the one or more medium voltage electrical heating elements comprises a plurality of medium voltage electrical heating elements, and
the electrical heating assembly further comprises:
a plurality of primary contactors, wherein each one of the plurality of primary contactors is coupled to one of the medium voltage electrical heating elements; and
a plurality of secondary contactors, wherein each one of the plurality of secondary contactors is coupled to one of the plurality of medium voltage electrical heating elements.

9. The electrical heating assembly of claim 8, wherein the control logic circuit closes at least one of the plurality of primary contactors and the plurality of secondary contactors to activate the dry-out mode.

10. The electrical heating assembly of claim 8, wherein the control logic circuit closes one of the plurality of primary contactors and one of the plurality of secondary contactors to activate the dry-out mode for one of the one or more medium voltage electrical heating elements.

11. A method for drying a medium voltage electrical heating element, the method comprising:
activating, by a control logic circuit, one or more medium voltage electrical heating elements at a first power level, wherein the one or more medium voltage electrical heating elements receive power from a medium voltage power source that supplies between 600 and 38,000 volts to the one or more medium voltage electrical heating elements wherein the one or more medium voltage electrical heating elements each comprise:
an outer metal sheath;
a resistive wire; and
a dual dielectric core positioned within the outer metal sheath, wherein the dual dielectric core comprises:
a first series of two or more axially-aligned outer tubular dielectric bodies positioned end-to-end, wherein the first series of two or more axially-aligned outer tubular dielectric bodies define a central longitudinal opening and have a first longitudinal axis; and
a second series of two or more axially-aligned inner tubular dielectric bodies having a second longitudinal axis, wherein:
the second series of two or more axially-aligned inner tubular dielectric bodies are positioned end-to-end in the sheath and are nested at least partially within the central longitudinal opening inside the first series of two or more axially-aligned outer tubular dielectric bodies;
the first longitudinal axis is co-axial with the second longitudinal axis;
the second series of two or more axially-aligned inner tubular dielectric bodies define an interior passageway and the resistive wire is positioned in the interior passageway; and
the second series of two or more axially-aligned inner tubular dielectric bodies are longitudinally staggered relative to the first series of two or more axially-aligned outer tubular dielectric bodies;
detecting, by a current leakage sensor, a current leakage of the one or more medium voltage electrical heating elements wherein the current leakage is proportional to an amount of moisture in contact with the one or more medium voltage electrical heating elements and wherein the current leakage is detected as a vector sum of a current flowing through the one or more medium voltage electrical heating elements; and
maintaining, by the control logic circuit, the one or more medium voltage electrical heating elements at the first power level, wherein the control logic circuit maintains the one or more medium voltage electrical heating elements at the first power level while the current leakage detected by the current leakage sensor is proportional to an unacceptable range of moisture in contact with the one or more medium voltage electrical heating elements.

12. The method of claim 11, wherein activating the one or more medium voltage electrical heating elements comprises activating, by the control logic circuit, the one or more medium voltage electrical heating elements simultaneously at the first power level.

13. The method of 11, wherein activating the one or more medium voltage electrical heating elements comprises:
activating, by the control logic circuit, the one or more medium voltage electrical heating elements sequentially at the first power level in response to the current leakage detected by the current leakage sensor.

14. The method of claim 13, wherein the first power level comprises 100% of a maximum power level of the one or more medium voltage electrical heating elements.

15. The method of claim 11, wherein activating and maintaining the one or more medium voltage electrical heating elements at the first power level comprises controlling, by the control logic circuit, a first plurality of contactors and a second plurality of contactors that are connected to the one or more medium voltage electrical heating elements.

16. The method of claim 15, wherein activating the one or more medium voltage electrical heating elements comprises activating, by the control logic circuit, at least one of the first plurality of contactors and at least one of the second plurality of contactors to activate one of the one or more medium voltage electrical heating elements.

17. The electrical heating assembly of claim 1, wherein the control logic circuit monitors the signal indicative of the current leakage from the one or more medium voltage electrical heating elements and stores historic data associated with the signal indicative of the current leakage in a computer-readable storage medium.

18. The method of claim 11, further comprising:
monitoring, by the control logic circuit, the detected current leakage by the current leakage sensor of the one or more medium voltage electrical heating elements; and storing, by the control logic circuit, historic current leakage data for the one or more medium voltage electrical heating elements in a computer-readable storage medium.

19. The method of claim 18, further comprising:
storing, by the control logic circuit, additional data in the computer-readable storage with the historic current leakage data, wherein the additional data comprises one or more of:
data indicative of which of the one or more medium voltage electrical heating elements produced the current leakage;
a power level of the heating element that produced the leakage current; and
an operational mode of the one or more medium voltage electrical heating elements that produced the leakage current.

* * * * *